Patented Dec. 26, 1933

1,940,934

UNITED STATES PATENT OFFICE 1,940,934

METHOD OF MAKING SUPPORTED CATALYSTS

Owen G. Bennett and Joseph C. W. Frazer, Baltimore, Md.; said Bennett assignor to Catalyst Research Corporation, Baltimore, Md., a corporation of Maryland No Drawing. Application March 16, 1931
Serial No. 523,175

4 Claims. (Cl. 23—233)

This invention relates to supported catalysts, and particularly to metallic catalysts.

For use in many catalytic processes it is desirable that the catalysts be mounted upon a support, or carrier. Asbestos, kieselguhr, charcoal, pumice, inorganic salts, and the like have been used for this purpose, but for many applications these materials are not suitable. For instance, in most vapor phase processes it is preferable to use metallic supports. Metals are more satisfactory structurally than the carrier typified by those named, and they provide a means of dissipating a part of the heat liberated at the catalyst in exothermic reactions. Furthermore, an electric current may be passed through them to supply heat, if necessary, thus eliminating the use of separate resistance elements.

Although for these and other reasons metallic supports are desirable, their use has been restricted to particular applications, partly because it has been difficult to obtain good adherence between the catalyst and its support, and simultaneously to provide the catalyst in the requisite highly active state. This is particularly true of metallic catalysts, and of the foraminous supports commonly preferred for vapor phase catalysis.

Also, the metallic catalysts prepared by the processes known prior to our invention have generally contained oxide, or other activity-reducing agent. While satisfactory for most purposes these metallic catalysts have not operated at maximum activity, for the oxide content reduces the metallic surface exposed for reaction. The use of metallic catalysts has been restricted also to certain metals because no satisfactory means has been available for the production of some metals in a catalytically active form. For instance, the so-called irreducible oxides are not amenable to reduction by hydrogen to provide catalytic metals.

It is among the objects of this invention to provide supported metallic catalysts, and especially metallic-supported catalysts of this type, which are characterized by satisfactory adherence between catalyst and support, high catalytic activity, and freedom from activity-reducing agents, and which may be made by a process which is simple and readily practised, and is applicable generally to all metals.

This invention is predicated upon our discovery that supported metallic catalysts may be made by surfacing a supporting member with an amalgam of mercury and the metal which is to act as catalyst, and evaporating the mercury from the amalgam. The metal remains upon the surface of the support in a form possessing satisfactory activity, and it adheres suitably to the support.

The invention is not restricted to supports of any particular form or material, the main criterion being that the support is capable of being surfaced with amalgam, which, in general, connotes its ability to be wet by mercury. Preferably, however, metallic supports are used, and particularly foraminous metallic structures, such as wire screens, and the invention will be described with reference thereto.

In the practice of the invention the screen is surfaced with amalgam of the desired catalytic metal. Where the screen comprises metal which is wet directly by mercury, copper for example, the amalgamation can be effected by dipping the support in mercury after appropriate cleaning. Some metals for instance nickel, do not amalgamate readily. Such metals may be amalgamated by preliminarily depositing hydrogen upon them. Thus an electric current is passed through a solution of sulfuric acid, or sodium carbonate, the screen acting as cathode. The metal is then contacted with mercury or a solution of a mercury salt. In general, metals of either type may be amalgamated by electrodeposition of mercury on the screen or other supporting form.

In the embodiment just described the invention provides a metallic support having a catalytic surface made up of the same metal as the support itself. The structures may likewise comprise a support formed from any suitable metal, such as copper or iron, surfaced with another metal in catalytic form. This may be done by applying a previously prepared amalgam of the desired catalytic metal to the surface of the support, or by electro-plating the support with the desired catalytic metal, and thereafter amalgamating the surface. This aspect of the invention is especially applicable to the production of catalysts of the rarer or refractory metals, and metals which are expensive, or which cannot be conveniently formed into supporting structures. In such cases the amalgams may be prepared most conveniently by electrodeposition of the metal onto a mercury cathode.

After the support has been surfaced with metallic amalgam it is placed in a suitable container, and the mercury is removed by vacuum distillation. The most suitable results are obtained with high evacuation, because this permits the use of relatively low distillation temperatures. The evaporation of the mercury from the article converts the metal at the surface to a form which is highly catalyst.

The catalysts thus produced are highly active. For example they oxidize rapidly in oxygen-containing and other activity-reducing gases. Therefore in most, if not all, cases the articles thus produced should be protected from such agencies. This may be done, for example, by placing them in a container filled with carbon dioxide gas, or by sealing them in the distillation container. Also, in most cases it is desirable not to expose the amalgams unduly to air before use and distillation.

The activity of catalysts prepared by the process provided by the invention is shown by tests which we have made. In one such test the surface of a nickel screen was amalgamated and the mercury distilled off, as described hereinabove. The surface of the screen was thus provided with a layer of finely divided catalytic nickel. A current of dry carbon monoxide was passed through the screen at room temperature, and practically all of the carbon monoxide was converted to nickel carbonyl. Similarly, our tests have shown that such a screen causes hydrogenation of ethylene at room temperature when the gases are passed through it. These tests demonstrate the high catalytic activity of our catalysts.

Our new supported catalysts are characterized by being strongly adherent to the support. It will be apparent that when the supporting and catalytic metal are the same, as in directly amalgamating copper screen, the continuity of the support is not disturbed. In other cases this adherence apparently results from the formation of a continuous metallic structure. Thus, whether the support be surfaced by application of amalgam, or by electroplating followed by amalgamation, the supporting metal is wet by mercury, and there is probably alloying between the surface and supporting metals at the surface of contact. This results in providing a continuous metallic structure when the mercury is evaporated.

A particular advantage of the invention resides in the fact that it makes possible the provision of catalysts consisting of metals which previously have not been available for catalytic purposes in their metallic form. It is applicable to any metal which can be amalgamated, and therefore it is of much wider applicability than the processes previously available for the production of supported catalysts.

The prior metallic catalysts have been produced commonly by the reduction of oxides. Such reduction processes are rarely complete, so that the catalysts contain small amounts of oxide which reduce the surface available for catalysis. Our catalysts, on the other hand, are made directly from metal, and are free from oxide. Therefore they possess a free metal surface of greater extent and activity, which is of substantial advantage.

A special advantage of the supported catalysts thus provided resides in the ease with which they can be revivified. All that is necessary is to re-amalgamate the surface and again distill the mercury therefrom. This is, of course, much simpler than previous processes of revivification.

Although the invention primarily contemplates catalysts consisting of metal, it will be understood that supported oxide catalysts embodying similar physical or structural characteristics can be obtained readily by appropriately oxidizing the metallic surface after preparing articles in the manner described hereinabove. It will be understood also that mixed catalysts are likewise within the scope of the invention. These may be made in the same manner, as by surfacing the support with an amalgam of the metals whose catalytic mixture is desired.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A method of making a supported metallic catalyst comprising covering a supporting member with an amalgam of a catalytically active metal, and removing the mercury from said amalgam by vacuum distillation to leave said catalytic metal distributed on said support.

2. A method of making a metal-supported metallic catalyst, comprising surfacing a metallic supporting member capable of being wet by mercury with an amalgam of a catalytic metal, and distilling the mercury from said amalgam, and thereby providing the surface of said supporting member with an adherent highly active coating of said catalytic metal.

3. A method of making a metal-supported metallic catalyst, comprising surfacing a metallic supporting member capable of being wet by mercury with an amalgam of a catalytic metal other than said member, and distilling the mercury from said amalgam, and thereby providing the surface of said supporting member with an adherent highly active coating of said catalytic metal.

4. A method of making a metal-supported metallic catalyst, comprising amalgamating the surface of an amalgamable foraminous metallic supporting member, and vacuum distilling the mercury from said amalgamated surface, and thereby providing the surface of said supporting member with an adherent coating of said metal in highly active catalytic condition.

OWEN G. BENNETT.
JOSEPH C. W. FRAZER.